US011932527B2

(12) United States Patent
Mullenaux et al.

(10) Patent No.: US 11,932,527 B2
(45) Date of Patent: Mar. 19, 2024

(54) LIQUID FILLING AND DISPENSING SYSTEM

(71) Applicant: AQUAPHANT INC., Las Vegas, NV (US)

(72) Inventors: Thomas Cody Mullenaux, San Pedro, CA (US); Miroslav Mitrovic, Laguna Hills, CA (US); Mark W. J. Kelly, Laguna Beach, CA (US)

(73) Assignee: AQUAPHANT INC., Las Vegas, NV (US)

( * ) Notice: Subject to any disclaimer, the term of this patent is extended or adjusted under 35 U.S.C. 154(b) by 0 days.

(21) Appl. No.: 17/651,658

(22) Filed: Feb. 18, 2022

(65) Prior Publication Data

US 2022/0259034 A1 Aug. 18, 2022

Related U.S. Application Data

(63) Continuation-in-part of application No. 17/451,131, filed on Oct. 15, 2021, which is a continuation-in-part of application No. 17/380,178, filed on Jul. 20, 2021, now Pat. No. 11,738,986, which is a continuation-in-part of application No. 17/176,350, filed on Feb. 16, 2021, now Pat. No. 11,672,367.

(51) Int. Cl.
*B67D 1/08* (2006.01)
*B67D 1/00* (2006.01)
*B67D 1/12* (2006.01)

(52) U.S. Cl.
CPC ......... *B67D 1/0894* (2013.01); *B67D 1/0888* (2013.01); *B67D 1/1277* (2013.01); *B67D 1/0014* (2013.01)

(58) Field of Classification Search
CPC ......... A47J 31/46; A47J 31/465; B01D 5/009; B01D 2202/00; B01D 53/265; E03B 3/00; E03B 3/28; E03B 11/00; B67D 1/0008; B67D 3/00; B67D 7/00
USPC ...................................................... 141/83, 94
See application file for complete search history.

(56) References Cited

U.S. PATENT DOCUMENTS 4,877,065 A * 10/1989 Lamboy .................... B65B 3/16 141/319
8,448,677 B2 * 5/2013 Ficai ........................ B65D 1/06 141/105
8,656,964 B1 * 2/2014 Chu ...................... B65B 31/003 141/105
8,777,182 B2 * 7/2014 Springer ............ A47G 19/2205 137/499
8,915,268 B2 * 12/2014 Burns ................... F17C 13/084 141/2
8,950,447 B2 * 2/2015 De Rosa ............. B05B 11/0038 141/285
9,016,333 B2 * 4/2015 Shaffer ................ B67D 1/1272 141/113
9,561,451 B2 2/2017 Dorfman
10,405,670 B1 9/2019 Mullenaux
10,513,213 B1 12/2019 Mullenaux
(Continued)

*Primary Examiner* — Timothy L Maust
(74) *Attorney, Agent, or Firm* — SHIMOKAJI IP

(57) ABSTRACT

A liquid filling and dispensing system includes a filling assembly having: a base subassembly configured to receive a liquid from a processing assembly; and a connection subassembly configured to releasably connect a container with the base subassembly by an applied force that is perpendicular to a longitudinal axis of the container.

16 Claims, 7 Drawing Sheets

(56) References Cited

U.S. PATENT DOCUMENTS

| | | | | |
|---|---|---|---|---|
| 10,626,581 | B1 | 4/2020 | Mullenaux | |
| 10,994,978 | B1 | 5/2021 | Mullenaux | |
| 11,066,286 | B1 | 7/2021 | Mullenaux | |
| 2011/0240170 | A1 * | 10/2011 | Fallon | B67D 1/1272<br>220/601 |
| 2012/0103926 | A1 * | 5/2012 | Ibsies | B65B 3/04<br>141/113 |
| 2021/0283529 | A1 | 9/2021 | Mullenaux | |
| 2021/0301506 | A1 | 9/2021 | Mullenaux | |

* cited by examiner

LIQUID FILLING AND DISPENSING SYSTEM

CROSS-REFERENCE TO RELATED APPLICATIONS

This application is a continuation-in-part of, and claims priority to and the benefit of, U.S. patent application Ser. No. 17/451,131, filed Oct. 15, 2021; which is a continuation-in-part of U.S. patent application Ser. No. 17/380,178, filed Jul. 20, 2021; which is a continuation-in-part of U.S. patent application Ser. No. 17/176,350, filed Feb. 16, 2021, all of which are incorporated herein in their entirety.

BACKGROUND OF THE DISCLOSURE

The present disclosure generally relates to liquid systems and, more particularly, to apparatus and methods of filling and dispensing liquid in a container.

Consumers often avoid drinking water from the tap. Accordingly, consumers frequently purchase pre-filled bottles of water. The bottles are often made of plastic and discarded after a single use. That contributes to environmental waste which does not quickly degrade. Also, the consumer must travel to a store to purchase more plastic bottles of water.

When the consumer is in a rented space, such as a hotel room or even vehicle, bottled water is often provided for a charge. However, the owner of the space may need to constantly replenish the bottles of water and discard the used bottles. At the same time, the owner may need to track the number of consumed bottles of water and charge the consumer accordingly.

As can be seen, there is a need for improved apparatus and methods to fill and dispense liquid.

SUMMARY OF THE DISCLOSURE

In one aspect of the present disclosure, a liquid filling and dispensing system comprises a filling assembly having: a base subassembly configured to receive a liquid from a processing assembly; a container configured to receive the liquid from the base subassembly; and a connection subassembly configured to releasably connect the container with the base subassembly by an applied force that is perpendicular to a longitudinal axis of the container.

In another aspect of the present disclosure, a liquid filling and dispensing system comprises a filling assembly having: a base subassembly configured to receive a liquid from a processing assembly; a connection subassembly configured to releasably mate a bottom area of a container with a bottom area of the base subassembly by two forces that are orthogonal to one another; and a verification subassembly configured to identify the container as valid or not.

In a further aspect of the present disclosure, a liquid filling and dispensing system comprises a filling assembly having: a base subassembly configured to receive a liquid from a processing assembly; a connection subassembly configured to releasably mate a bottom area of a container with a bottom area of the base subassembly by an applied force that is parallel to a longitudinal axis of the container and an applied force that is perpendicular to the longitudinal axis; and a weighing subassembly configured to weigh the container.

In yet another aspect of the present invention, a container for a filling assembly of a liquid filling and dispensing system comprises a body portion having a bottom area that includes an exterior void space; and a first coupling affixed to the bottom area in the void space, wherein the first coupling is configured to releasably connect, by a friction fit, to a second coupling in the filling assembly that is configured to fill the container with a liquid.

These and other features, aspects and advantages of the present disclosure will become better understood with reference to the following drawings, description, and claims.

DETAILED DESCRIPTION OF THE DISCLOSURE

Figure 1:
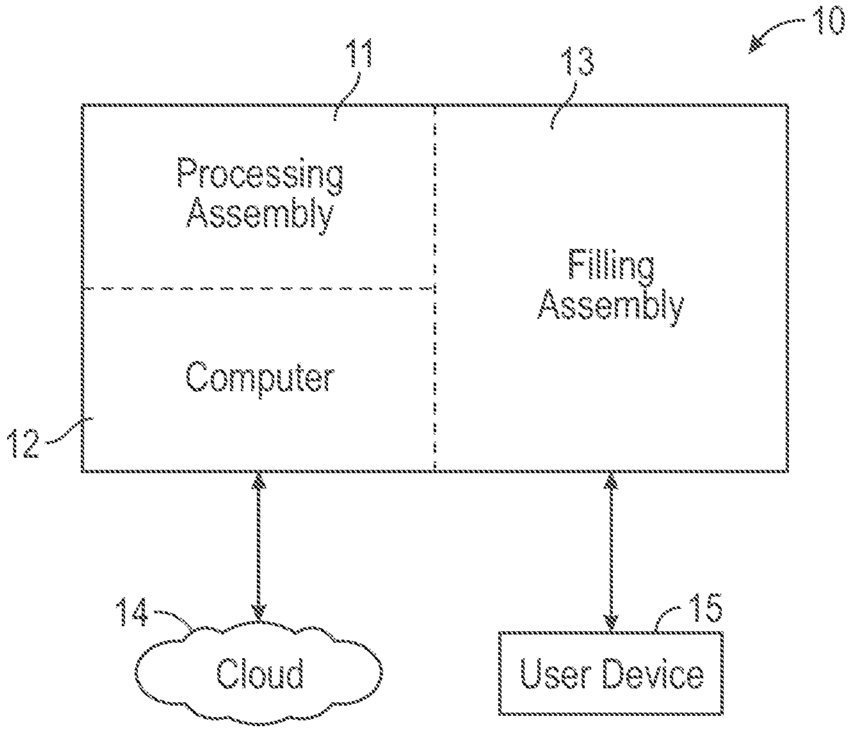
FIG. 1 is a schematic diagram of a liquid filling and dispensing system according to an embodiment of the present disclosure.

The following detailed description is of the best currently contemplated modes of carrying out the disclosure. The description is not to be taken in a limiting sense, but it is merely for the purpose of illustrating the general principles of the disclosure, since the scope of the disclosure is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As used herein, the terms "embodiment" and "embodiments" are intended to be used interchangeably. In other words, the singular includes the plural, and vice versa.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "assembly," or "system". Furthermore, aspects of the present disclosure may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Here, the technical problems to be solved are that environmental waste is created from plastic containers having liquids for human consumption. In various vendor-consumer environments, the provision of liquid in plastic containers needs to enable only paying consumers to obtain containers of liquid.

Broadly, the present disclosure solves the foregoing problems by providing apparatus and methods for filling and dispensing liquid, such as water, for human consumption. In the present disclosure, liquid may be stored and then pumped to a filling assembly. The present disclosure may enable the easy and quick attachment/detachment of a container (e.g., bottle) to a filling assembly, whereby the container can be filled with liquid and then removed for liquid consumption. In embodiments, the container can be reusable. The present disclosure may determine—via a verification subassembly—whether the container is valid. If valid, and based on stored characteristics of the container, the present disclosure may fill the container with liquid. The present disclosure may enable a user to have an account which can be monetarily charged each time a container is filled.

FIG. 1 is a schematic diagram of an exemplary embodiment of a liquid filling and dispensing system 10. In exemplary embodiments, the system 10 may be in a vehicle, in a hotel room, in a restaurant, or in other environments such as where the controlled dispensing of liquid into a container is desired.

In an embodiment, the system 10 may include a processing assembly 11 which operatively communicates with a filling assembly 13 and with a computer 12 (i.e., a CPU/processor/controller/database). In an embodiment, the computer 12 may be separate from the processing assembly 11 and separate from the filling assembly 13. Or, in an embodiment, the computer 12 may be a part of the processing assembly 11 or a part of the filling assembly 13. In an embodiment, the computer 12 may store information in a cloud 14, or locally.

According to an embodiment, a user device 15—such as a desktop, a laptop, mobile phone, or computer—may communicate with the system 10—wirelessly or wired. For example, the user device 15 may initiate a start of the processing assembly 11, initiate a start of the filling assembly 13, and/or initiate a creation of a user account as further described below.

In an embodiment, the processing assembly 11 may provide a processing of liquid that can be transported to the filling assembly 13. In embodiments, the liquid may be water. In other embodiments, the liquid may be a drink suitable for human consumption, such as juice, soda or coffee.

The processing assembly 11 may, in an embodiment, be configured to store and pump a liquid among tanks and filters. In an embodiment, the processing assembly 11 may be further configured to pump the liquid to the filling assembly 13. The filling assembly 13 may determine whether a container is valid or not. If valid, according to an embodiment, the filling assembly 13 may then use stored characteristics of the container to fill the container with liquid, such as water.

Figure 2:
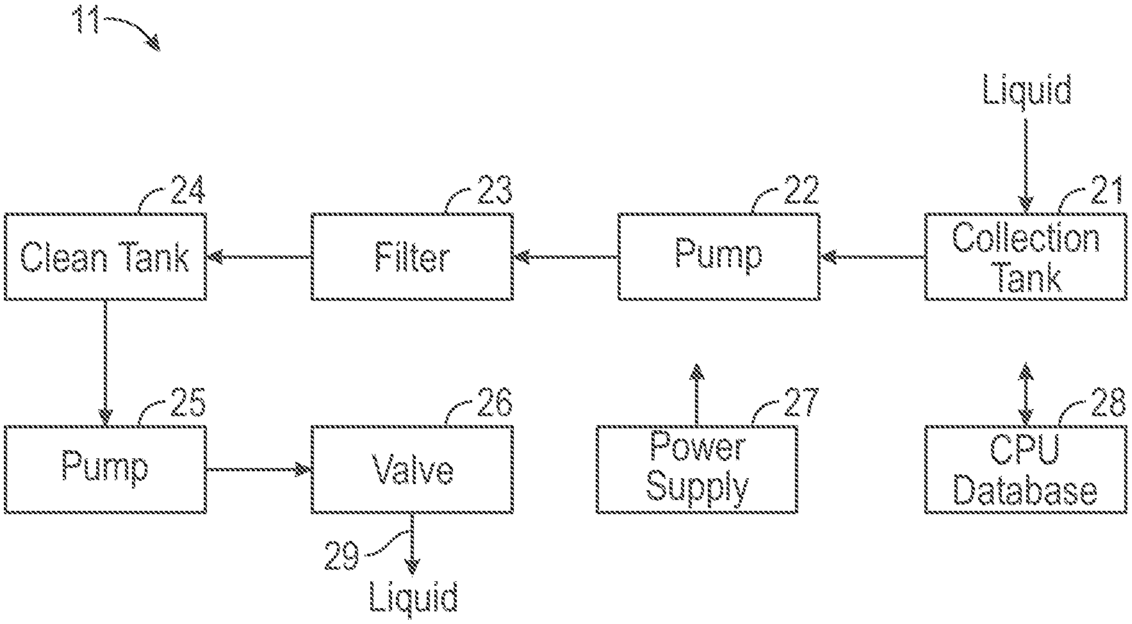
FIG. 2 is a schematic diagram of a processing assembly according to an embodiment of the present disclosure.

FIG. 2 is a schematic diagram of an exemplary embodiment of the processing assembly 11. The processing assembly 11 may, in an embodiment, collect liquid in a collection tank 21. From the collection tank 21, a pump 22 may pump the liquid through a filter 23 to remove particulates and/or contaminants, for example. The filtered liquid from the filter 23 may move into a clean tank 24, according to an embodiment. A pump 25 may then pump the filtered liquid from the clean tank 24 and through a valve 26 to produce a consumable liquid 29, in an embodiment. From the valve 26, the consumable liquid 29 may be transferred to the filling assembly 13.

The processing assembly 11 may, in embodiments, include a power supply 27 that may supply power to one or more of the components in the assembly 11, such as the pumps 22, 25. In embodiments, the processing assembly 11 may also include a computer 28 (i.e., CPU/processor/controller/database) to communicate with and control the operation of one or more of the components in the assembly 11. In another embodiment, the computer 12 may communicate with and control the operation of one or more of the components in the assembly 11. In an embodiment, the computers 12, 28 may store information in the cloud 14, or locally.

In embodiments, the computer/controller 12, 28 may be configured to determine whether the collection tank 21 is empty (e.g., via a sensor in the tank 21) and/or to start/stop operation of one or more of the components in the processing assembly 11.

In an embodiment where the liquid is water, the processing assembly 11 may acquire humidified air from an environment outside of the system 10, such as the air inside and/or outside of a vehicle. The processing assembly 11 may be further configured to condense water from the humidified air (i.e., dehumidify the humidified air). According to an embodiment, the processing assembly 11 may also be configured to filter the humidified air and/or filter the condensed water. The foregoing is further described in U.S. patent application Ser. No. 17/451,131, filed Oct. 15, 2021, which is incorporated herein in its entirety.

Figure 3:
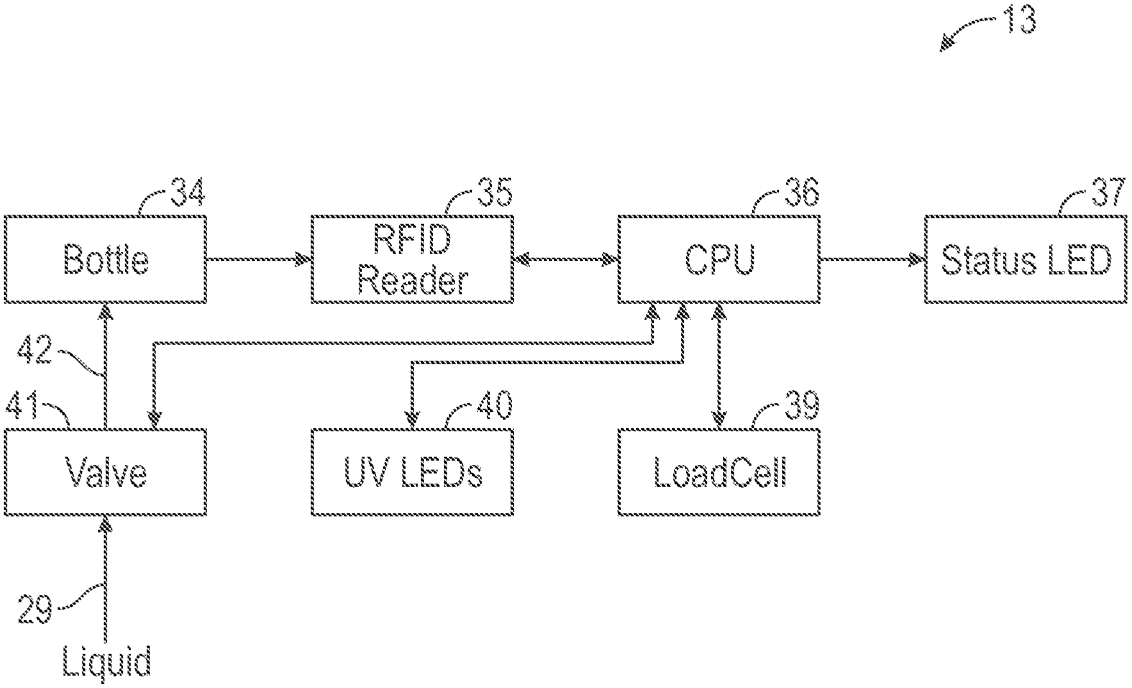
FIG. 3 is a schematic diagram of a filling assembly according to an embodiment of the present disclosure.

FIG. 3 is a schematic diagram of an exemplary embodiment of the filling assembly 13. In embodiments, the filling assembly 13 may have a verification subassembly which may include an RFID reader 35 that may read an RFID tag on a container 34 to be filled with liquid. A status LED 37 may indicate the filling status of the assembly 13. The filling assembly 13 may further include a weighing subassembly which may include a load cell 39 that may weigh a container 34 that is empty or full of liquid or partially full of liquid. A UV-LED 40 may be included in the filling assembly 13, in an embodiment, and which can destroy bacteria and the like before liquid enters the container 34. In an embodiment, a valve 41 may receive liquid 29 from the processing assembly 11 and a liquid line 42 may direct the liquid into the container 34.

In the filling assembly 13, according to an embodiment, a computer 36 (i.e., CPU/processor/controller/database) may communicate with and control one or more of the other components in the filling assembly 13. In another embodiment, the computer 12 may communicate with and control one or more of the components in the filling assembly 13. In an embodiment, the computers 12, 36 may store information in the cloud 14, or locally.

Figure 4:
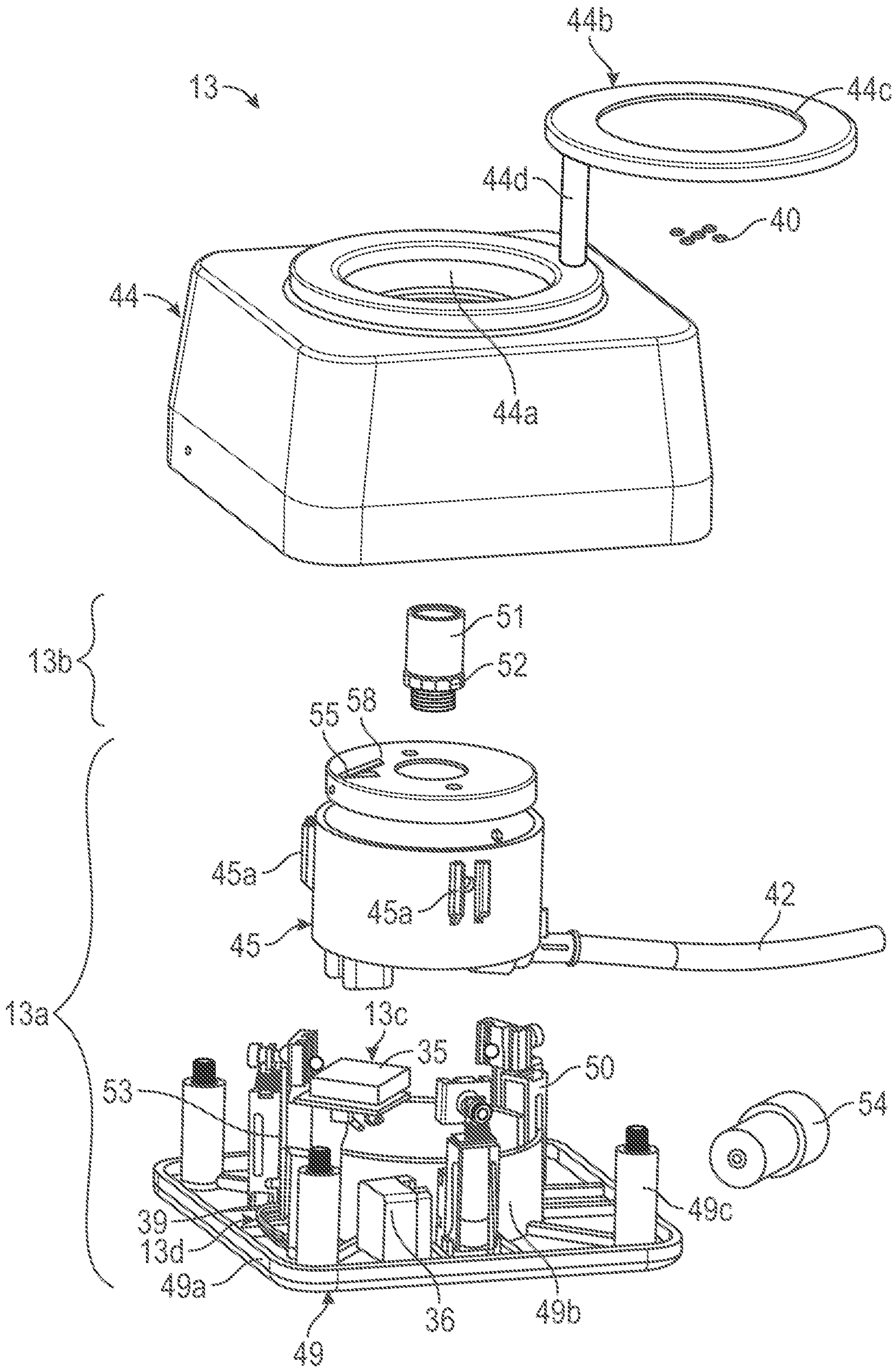
FIG. 4 is a partial, exploded view of a liquid filling and dispensing assembly according to an embodiment of the present disclosure.

FIG. 4 is a partial, exploded view of a filling assembly 13, according to an exemplary embodiment. The filling assembly 13 may include a base subassembly 13*a*, a connection subassembly 13*b*, a verification subassembly 13*c*, a weighing subassembly 13*d*, and a cover 44 to house the foregoing subassemblies, in an embodiment.

According to an embodiment, the cover 44 may have an aperture 44*a* therein, wherein the aperture 44*a* can be positioned operatively adjacent to and receive the container 34 to be filled with liquid, according to an embodiment. The cover 44 may include a lid 44*b*, in an embodiment, which may include a planar element 44*c* which can rotate about a post element 44*d*. In an embodiment, the filling assembly 13 (e.g., the base subassembly 13*a*) may move the lid 44*b* over the aperture 44*a* when the filling assembly 13 is not in use and may move the lid 44*b* to expose the aperture 44*a* when the filling assembly 13 is in use.

In an embodiment, one or more UV-LEDs 40 can be supported by the cover 44. One or more of the UV-LEDs 40 may be disposed at a side of the planar element 44*c* which interfaces the aperture 44*a*, according to an embodiment. As noted above, the one or more UV-LEDs may destroy bacteria and the like before liquid enters the container 34.

In FIG. 4, according to an embodiment, the base subassembly 13*a* can be configured to receive liquid from the processing assembly 11. In an embodiment, the base subassembly 13*a* may include a container holder 45 which can be configured to receive and hold the container 34, such as a bottom area thereof. In an embodiment, the container holder 45 can be cup shaped. In an embodiment, the container holder 45 may include one or more receiving slots or elements 45*a* which, for example, may be positioned about an exterior cylindrical surface of the container holder 45. One or more of the receiving slots 45*a* may be configured to receive at least a part of the connection subassembly 13*b* as described below.

The base subassembly 13*a* may include a liquid line 42 that may transport liquid from the processing assembly 11 to the base subassembly 13*a*, according to an embodiment. In an embodiment, the liquid line 42 may extend into the container holder 45, such as through a bottom area of the container holder 45 and eventually attach to the connection subassembly 13*b*, as described below.

In an embodiment, the base subassembly 13*a* may include a base plate 49. The base plate 49, in an embodiment, may have a planar bottom element 49*a* at a bottom thereof, a cup shaped element 49*b* affixed on the bottom element 49*a*, and one or more post elements 49*c* affixed on the bottom element 49*a* and which may be disposed near and/or along a perimeter of the bottom element 49*a*. The cup shaped element 49*b* may be configured to receive and hold the container holder 45, in an embodiment. The one or more post elements 49*c* may support the cover 44 over the base plate 49, in an embodiment.

In FIG. 4, the base subassembly 13*a*, such as the bottom element 49*a* of the base plate 49, may support thereon at least a portion of the connection subassembly 13*b*, according to an embodiment. In an embodiment, the base subassembly 13*a* may be configured to enable the connection subassembly 13*b* to move in a direction parallel to the longitudinal axis 34*d* of the container 34.

In an embodiment, the bottom element 49*a* of the base plate 49 may support one or more solenoids 50 in an upright orientation and which solenoids 50 form a part of the connection subassembly 13*b*. In an embodiment, the one or more solenoids 50 may be positioned outside of and about the cup shaped element 49*b* of the base plate 49. In an embodiment, the one or more solenoids 50 may operatively interface the one or more slots 45*a* on the container holder 45.

In an embodiment, the base subassembly 13*a* may include a base connector 52. The base connector 52 may, in an embodiment, connect to and enable liquid communication between the connection subassembly 13*b* and the liquid line 42.

In FIG. 4, according to an embodiment, the base subassembly 13*a*, such as the bottom element 49*a* of the base plate 49, may support thereon at least a portion of the weighing subassembly 13*d*. In an embodiment, the weighing subassembly 13*d* may include a load cell 39 and an interface board 53 to control the former. In an embodiment, the load cell 39 may be positioned within the cup shaped element 49*b* of the base plate 49, while the interface board 53 may be positioned outside of the cup shaped element 49*b*.

In an embodiment, the base subassembly 13*a*, such as the cup shaped element 49*b* of the base plate 49, may support thereon at least a portion of the verification subassembly 13*c*. The verification subassembly 13*c* may include the RFID reader 35.

In an embodiment, the base subassembly 13*a* may include the computer 36 described above. The base subassembly 13*a* may further include a motor/gearbox 54 which can rotate the cover lid 44*b* over and away from the cover aperture 44*a*. In an embodiment, as described below, when the fill assembly 13 is in a fill position/state, the motor/gearbox 54 may be initiated, via the computer 36, to move the cover lid 44*b* away from the cover aperture 44*a*. In an embodiment, when the fill assembly 13 is in a non-fill position/state, the motor/gearbox 54 may be initiated, via the computer 36, to move the cover lid 44*b* over from the cover aperture 44*a*.

In FIG. 4, the connection subassembly 13*b* may include a first coupling 51, in an embodiment. The first coupling 51 may be a female coupling that can be configured to releasable mate/connect with a second coupling (e.g., male coupling) of the connection subassembly 13*b*, though not shown in FIG. 4.

Figure 5:
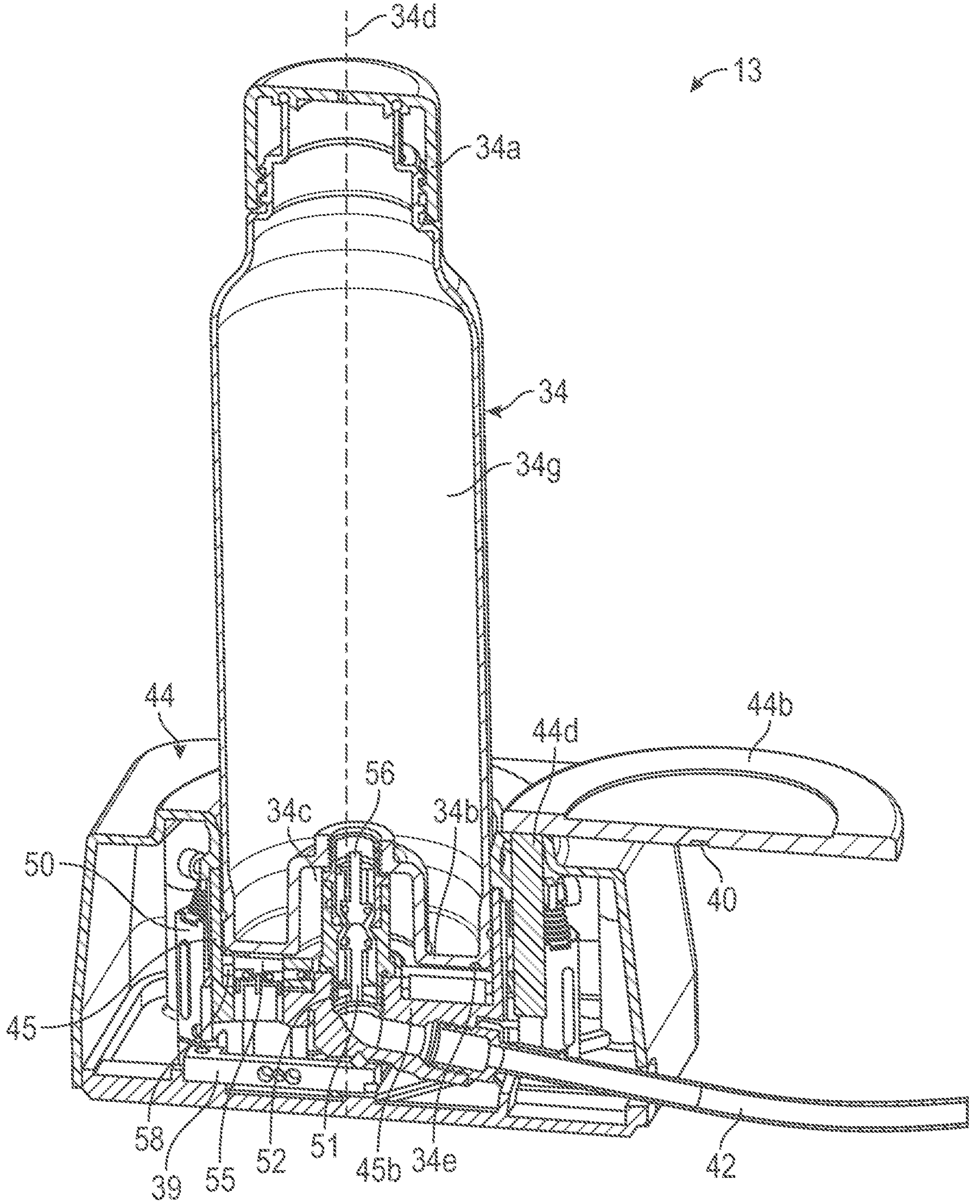
FIG. 5 is a cross sectional view of a liquid filling and dispensing assembly according to an embodiment of the present disclosure.

In FIG. 5, a cross section of the filling assembly 13 is shown. The filling assembly 13 may include a container 34 configured to receive liquid from the base subassembly 13*a*. In an embodiment, the container 34 can have a body portion 34*g*, a cap 34*a* configured to fit at one end of the body portion 34*g*, and a bottom portion or area 34*b* at an opposite end of the body portion 34*g*. In an embodiment, the bottom area 34*b* may be configured to provide a receiving portion or void space 34*c* on an exterior of the container 34. According to an embodiment, the container 34 may extend along a longitudinal axis 34*d*. The container 34 may further include an RFID tag 34*e*, such as on an exterior surface of the bottom area 34*b* of the container 34.

As shown in FIG. 5, the container 34 may be placed in a fill position/state, such as by a user. In an embodiment, the user may insert the container 34, such as the bottom area 34*b* thereof, into the container holder 45. A force of gravity on the container 34 may occur as the user releases the container 34 into the container holder 45. The force of gravity may be parallel to the longitudinal axis 34*d*, depending on the orientation of the filling assembly 13. Herein, the term "parallel" is intended to mean "exactly parallel", as well as "generally parallel" or "substantially parallel."

Also, in an embodiment, an applied force may be created on the container 34 in the fill position/state. The applied force may be external to the filling assembly 13 and result from the user pushing down on the container 34 towards the container holder 45, according to an embodiment. The externally applied force can be parallel to the longitudinal axis 34*d* of the container 34, according to an embodiment.

The connection subassembly 13*b* can be activated, according to an embodiment, as or upon the container 34 being placed in the fill position. The connection subassembly 13*b* may be configured to releasably connect/mate the container 34 with the base subassembly 13*a*, in an embodiment. The connection subassembly 13*b* may also be configured to releasably connect/mate, as above, by an applied force(s) that is (are) perpendicular or parallel to the longitudinal axis 34*d* of the container 34, in an embodiment. Herein, the term "perpendicular" is intended to mean "exactly perpendicular", as well as "generally perpendicular" or "substantially perpendicular".

Accordingly, in an embodiment, the connection subassembly 13*b* may be configured to releasably connect/mate, as above, by two forces that are orthogonal to one another. The connection subassembly 13*b* may be configured to transport liquid in only one direction therein—from the base subassembly 13*a* to the container 34—in an embodiment. The connection subassembly 13*b* may also be configured to create a liquid pressure differential therein.

According to an embodiment, the connection subassembly 13*b* may include a microswitch holder 58 which, for example, may be donut shaped (FIG. 4). The microswitch holder 58 may support one or more microswitches 55, in an embodiment. The microswitch holder 58 and the microswitch(es) 55 may be disposed in the container holder 45, in an embodiment.

The one or more microswitches 55 may be configured and disposed to sense the presence of the container 34, in an embodiment. For example, the one or more of the microswitches 55 may be positioned in the container holder 45. When the bottom area 34*b* of the container 34 contacts one or more of the microswitches 55, the one or more microswitches 55 may send a signal to the computer 36 indicating the presence of the container 34, in an embodiment. The computer 36 may, in turn, then activate other components of the fill assembly 13, such as the one or more solenoids 50. In an embodiment, the computer 36 may, in turn, be configured to activate one or more of the components in the processing assembly 11.

Similarly, according to an embodiment, the one or more microswitches 55 may be configured to sense the absence of the container 34. In such a situation, the one or more microswitches 55 may not send a signal to the computer 36. The computer 36 may, in turn, be configured to prevent the activation of one or more of the components in the fill assembly 13 and/or the processing assembly 11.

In embodiments, the connection subassembly 13*b* can include a first coupling 51 and a second coupling 56. The first and second couplings 51, 56 may be configured to couple and decouple by a friction fit, according to an embodiment. The first and second couplings 51, 56 may, in embodiments, be male and female couplings. In an embodiment, the first coupling 51 may be a female coupling and the second coupling 56 may be a male coupling.

Figure 7:
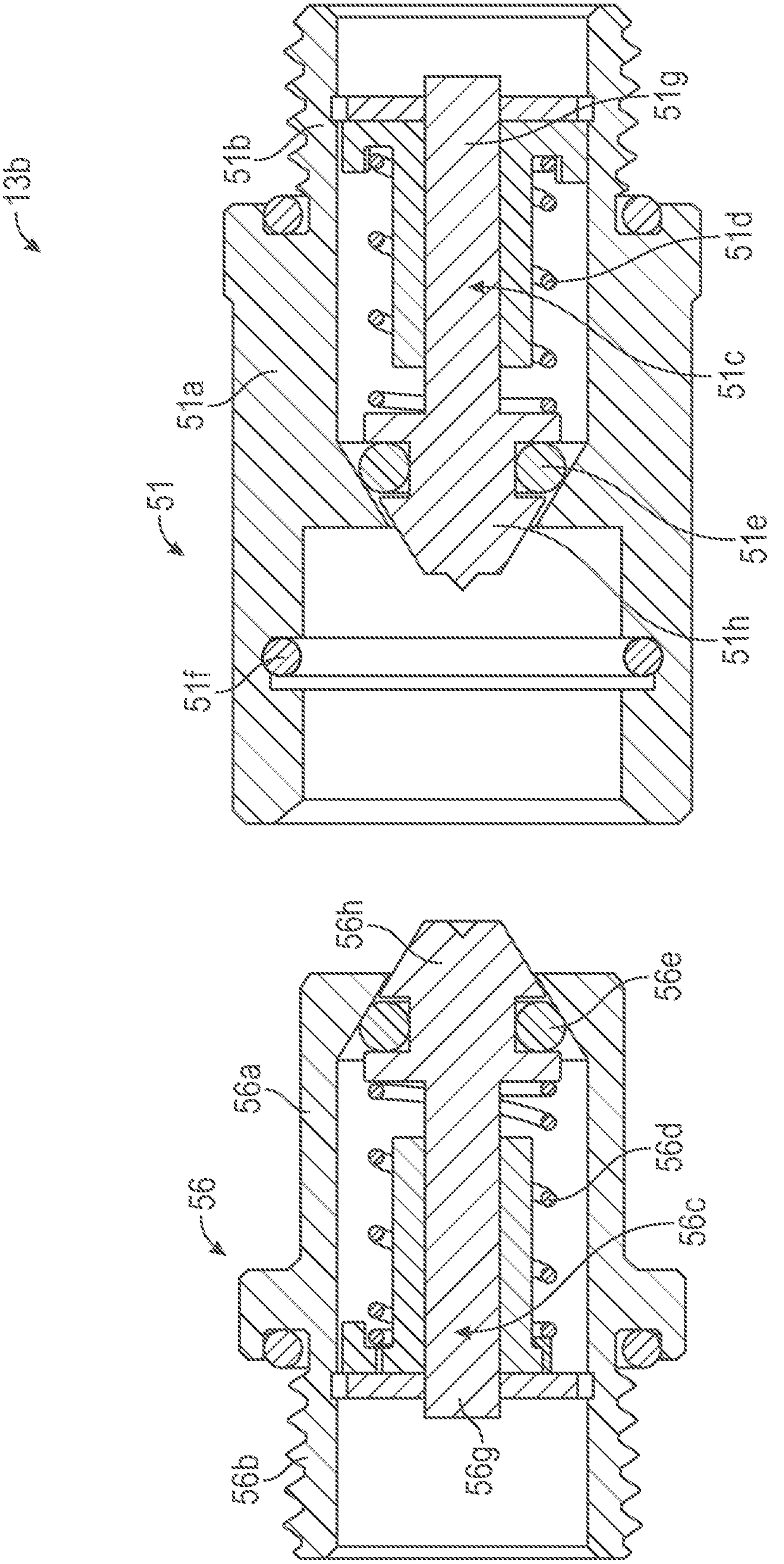
FIG. 7 is a partial, cross-sectional view of a connection subassembly according to an embodiment of the present disclosure.

FIG. 7 is a cross-sectional view of the first or female coupling 51 and of the second or male coupling 56, in an embodiment. The female coupling 51 may include an outer sleeve 51*a*, in an embodiment. At an end of the outer sleeve 51*a*, which is opposite an end that is configured to receive the male coupling 56, can be a fitting 51*b*, in an embodiment. The fitting 51*b* may be configured to mate with the base connector 52 described above. A plunger 51*c* may be inside the sleeve 51*a*. In an embodiment, a spring 51*d* may surround a post portion 51*g* of the plunger 51*c*. An O-ring 51*e* may surround a head portion 51*h* of the plunger 51*c*, according to an embodiment. An O-ring 51*f* may be inside the sleeve 51*a* near the end thereof which receives the male coupling 56.

The male coupling 56 may include an outer sleeve 56*a*, in an embodiment. At an end of the outer sleeve 56*a*, which is opposite an end that is configured to be inserted into the female coupling 51, can be a fitting 56*b*, in an embodiment. In an embodiment, the fitting 56*b* may be configured to attach to the receiving portion 34*c* of the container 34. A plunger 56*c* may be inside the sleeve 56*a*. In an embodiment, a spring 56*d* may surround a post portion 56*g* of the plunger 51*c*. An O-ring 56*e* may surround a head portion 56*h* of the plunger 56*c*, according to an embodiment.

In FIG. 7, according to an embodiment, the male coupling 56 can move (such as from the user moving the container 34 into the container holder 45 in the fill position/state) towards the female coupling 51 which remains stationary while affixed to the container holder 45. The sleeve 56*a* of the male coupling can be inserted into the sleeve 51*a* of the female coupling. The O-ring 51*f* of the female coupling may then create a friction fit about an exterior of the male sleeve 56*a*, in an embodiment. The respective head portions 56*h*, 51*h* of the male and female plungers 56*c*, 51*c* may then contact one another, according to an embodiment.

In an embodiment, as the male plunger 56*c* continues to press further against the female plunger 51*c*, the head portion 51*h* of the female plunger 51*c* can move towards the female fitting 51*b* and may compress the female spring 51*d*. At or around the same time, in an embodiment, the female O-ring 51*e* around the head portion 51*h* of the female plunger 51*c* may disengage contact with an interior surface of the female sleeve 51*a*, according to an embodiment.

Concurrently or around the same time as the foregoing, in an embodiment, the head portion 56*h* of the male plunger 56*c* can move towards the male fitting 56*b* and may compress the male spring 56*d*. The male O-ring 56*e* around the head portion 56*h* of the male plunger 56*c* may then disengage contact with an interior surface of the male sleeve 56*a*, according to an embodiment.

In an embodiment, the mutual disengagement by the male and female O-rings 51*e*, 56*e* with their respective sleeves 51*a*, 56*a* may then allow liquid to flow from liquid line 42, into the female fitting 51*b*, through the female sleeve 51*a*, into the male sleeve 56*a*, out the male fitting 56*b*, and into the container 34. The foregoing can be the fill position/state when the couplings 51, 56 are releasably connected to one another. Likewise, in an embodiment, a mutual engagement by the male and female O-rings 51*e*, 56*e* with their respective sleeves 51*a*, 56*a* may prevent liquid to flow from liquid line 42, into the female fitting 51*b*, through the female sleeve 51*a*, into the male sleeve 56*a*, out the male fitting 56*b*, and into the container 34. The foregoing can be a non-fill position/state when the couplings 51, 56 are disconnected from one another.

Referring to back to FIG. 5, in an embodiment, the first coupling 51 may be attached to either the container 34 or the base subassembly 13*a*, while the second coupling 56 may be attached to the other of the container 34 and the base assembly 13*a*. In the fill position/state, according to an embodiment, when the first and second couplings 51, 56 can be releasably connected to one another, the couplings 51, 56 may create a liquid pressure differential therein, according to an embodiment. The pressure differential may result from pressurized liquid entering one of the couplings (e.g., the first coupling 51) and pressurized liquid exiting the other of the couplings (e.g., the second coupling 56) and into the container 34, according to an embodiment. In embodiments, pressure of the liquid entering the coupling 51 can be higher than the pressure of the liquid exiting the coupling 56. In an embodiment, the higher pressure of the liquid entering the coupling 56 may be due to the liquid being pumped from the processing assembly 11. In an embodiment, the lower pressure of the liquid exiting the coupling 56 may be due to a low liquid pressure in the container 34.

The connection subassembly 13*b* can be disconnected or inactivated, according to an embodiment, as or upon the container 34 being removed from the fill position to the non-fill position wherein liquid is not entering the container 34. In an embodiment, as the user removes the container 34 from the stationary container holder 45, the first and second couplings 51, 56 may decouple. In an embodiment, the decoupling may occur due to the loss of friction fit between the O-ring 51*f* in the first coupling 51 and the sleeve 56*a* in the second coupling 56.

Upon decoupling, liquid can be prevented from passing from one coupling to another, such as from the first coupling 51 to the second coupling 56, in an embodiment. Also, upon decoupling, the coupling 51 or 56 attached to the container 34 is configured to prevent liquid from exiting the container 34 through such coupling. The prevention of liquid flow can result from the female plunger 51*c* moving to a position where the O-ring 51*e* contacts the interior of the female sleeve 51*a*, and from the male plunger 56*c* moving to a position where the O-ring 56*e* contacts the interior of the male sleeve 56*a*.

In FIGS. 1 and 5, a verification subassembly 13*c* can include the RFID reader 35 adjacent the container holder 45 and the RFID tag 34*e* on the container 34, according to an embodiment. When the container 34 is operatively near or in the container holder 45, the reader 35 may read the tag 34*e*, in an embodiment. When read, the computer 36 may determine whether the container 34 is valid or not. In other words, determine whether the user has a valid user account and/or whether the container 34 is an authorized container to be filled with liquid.

Figure 6A:
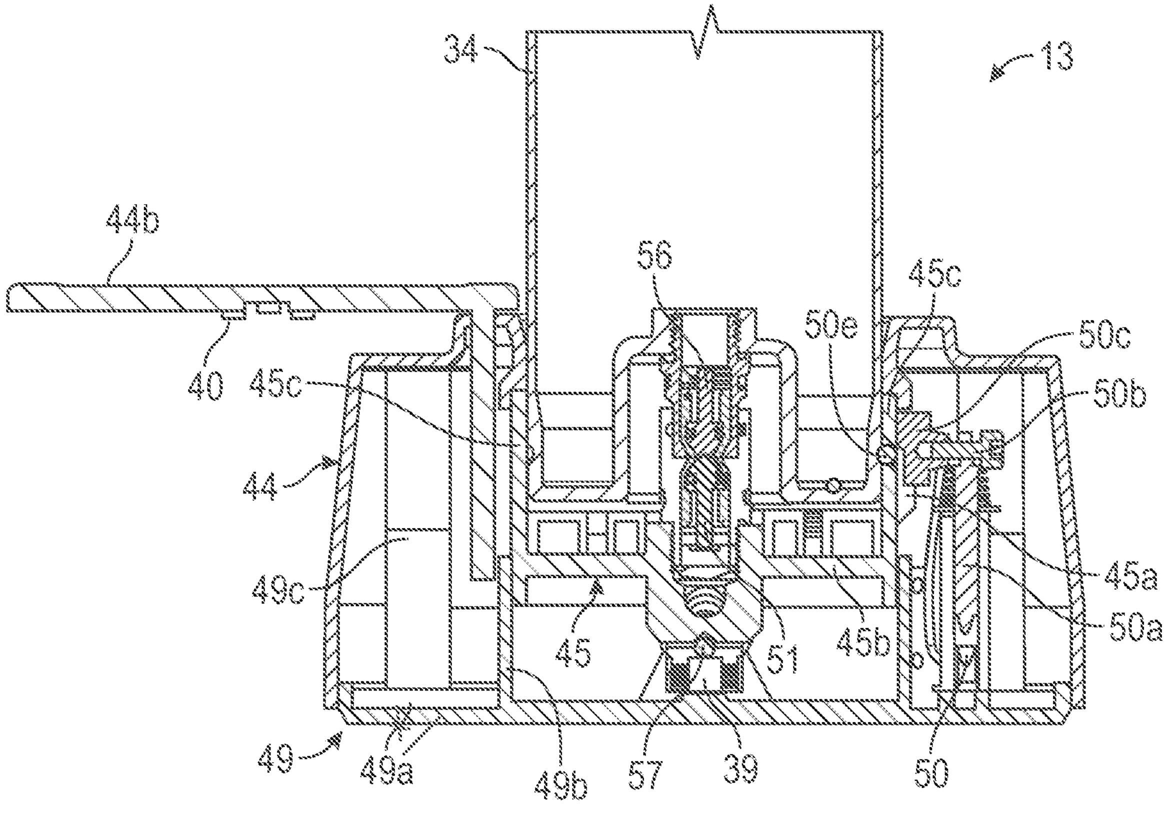
FIG. 6A is a partial, cross-sectional view of a liquid filling and dispensing assembly according to an embodiment of the present disclosure.

In FIG. 6A, a partial cross section of the filling assembly 13 is shown. In an embodiment, the container holder 45 may include a bottom portion or area 45*b* and an upstanding wall 45*c* extending perpendicular therefrom. One or more apertures 45*d* may be in the wall 45*c*, according to an embodiment.

The connection subassembly 13*b* may be configured to impart an applied force that can be perpendicular to the longitudinal axis 34*d* of the container 34, according to an embodiment. The applied force can be from the one or more solenoids 50, in an embodiment. Each solenoid 50 can include a post element 50*a* arranged lengthwise in a direction parallel to the longitudinal axis 34*d*. An attachment element 50*b* may be supported at one end of the post element 50*a*, in an embodiment. The attachment element 50*b* may, in turn, support an insertion element 50*c*.

Figure 6B:
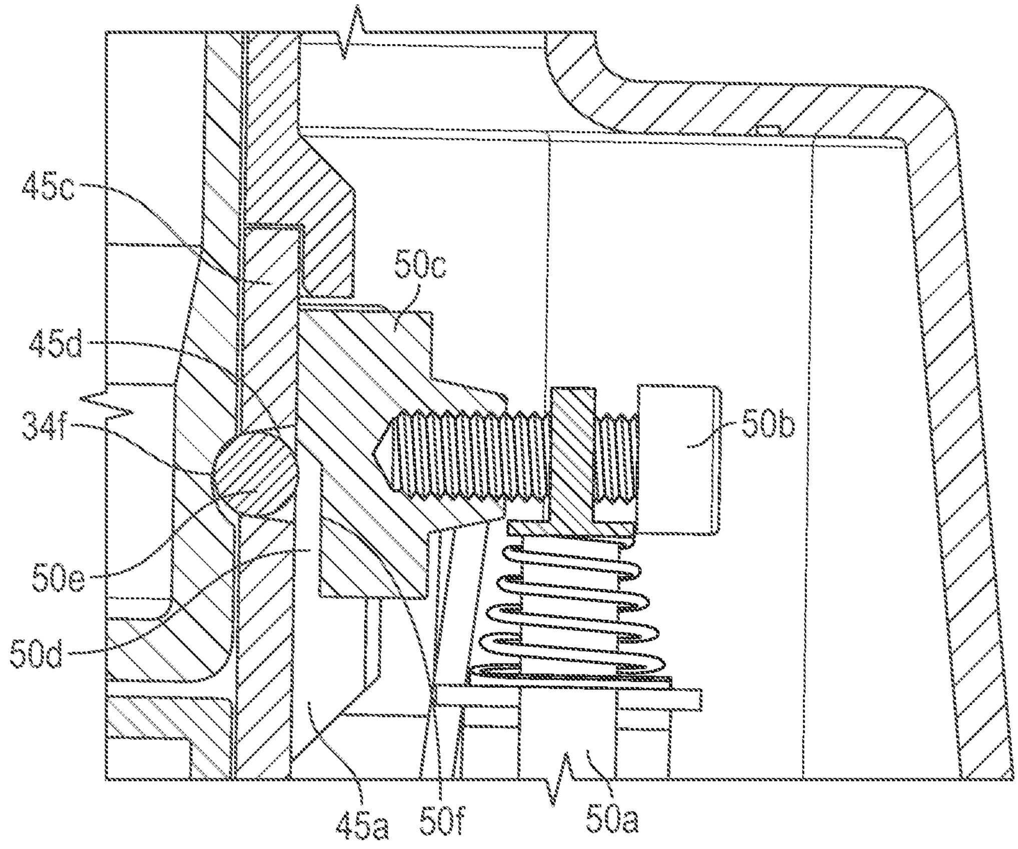
FIG. 6B is a partial, enlarged cross-sectional view of a liquid filling and dispensing assembly according to an embodiment of the present disclosure.

FIG. 6B is an enlarged, partial cross section of the filling assembly 13. In an embodiment, the insertion element 50*c* may be configured to be inserted into a receiving slot 45*a* on the upstanding wall 45*c* of the container holder 45. Further, the insertion element 50*c* may be configured with a recessed surface 50*f* that interfaces the upstanding wall 45*c* to produce a gap 50*d* between the insertion element 50*c* and the upstanding wall 45*c*.

In FIG. 6B, the connection subassembly 13*b* may include one or more ball bearings 50*e* and one or more races 34*f*, according to an embodiment. In an embodiment, the ball bearing(s) 50*e* and the race(s) 34*f* can be configured to interface the container 34 with the base assembly 13*a*. Each ball bearing 50*e* can be configured to fit in a respective aperture 45*d* in the upstanding wall 45*c*. In an embodiment, the ball bearing 50*e* can be further configured to fit in the race 34*f*. The race 34*f*, in an embodiment, can be on an exterior surface of the container 34 and, in an embodiment, extend about a circumference of the container 34.

According to an embodiment, in the non-fill position before the container 34 is moved into the container holder 45, the ball bearing(s) 50*e* may remain in the aperture(s) 45*d* of the upstanding wall 45*c*. At or around that time, the insertion element(s) 50*c* can be positioned whereby the recessed surface 50*f* thereon leaves the gap 50*d* at the position of the ball bearing 50*e*, in an embodiment. Thereby, there is little or no applied pressure on the ball bearing 50*e* in a direction perpendicular to the longitudinal axis 34*d* of the container 34.

In an embodiment, when the container 34 is moved into the container holder 45 to the fill position, the one or more microswitches 55 may be depressed and sense the presence of the container 34. The one or more microswitches 55 may then signal the computer 36 to activate the one or more solenoid(s) 50, in an embodiment. Upon activation, the insertion element 50*c* may move to a position to eliminate the gap 50*d*, according to an embodiment. By such gap elimination, the insertion element 50*c* can impart an applied force on the ball bearing 50*e*, in an embodiment. The applied force can be perpendicular to the longitudinal axis 34*d* of the container 34. In an embodiment, the applied force can move the ball bearing 50*e* into and/or against the race 34*f*. That can enable the container 34 to be held in the container holder 45.

In FIG. 6A, the weighing subassembly 13*d* may include a load cell 39 in communication with a ball bearing 57, in an embodiment. The ball bearing 57 may be in continuous contact with the bottom 45*b* of the container holder 45—whether the container 34 is in the fill or non-fill position—according to an embodiment. Thus, when the container 34 is in the fill position in the container holder 45, the weight of the container 34 is transferred to the ball bearing 57 and then to the load cell 39, in an embodiment. The load cell 39 can read the weight of the container 34 and send the information to the computer 36.

In turn, the computer 36 may be configured to determine whether the container 34 is to be filled (completely or partially) or not, in an embodiment. The computer may be configured to determine whether the processing assembly 11 is to be activated or not, in an embodiment.

According to an embodiment, the computers 12 and/or 36 (i.e., the controllers) may be configured to identify a presence of the container 34 operatively adjacent to the filling assembly 13 (such as by reading RFID sensor 35 when the user moves the container 34 over or near the filling assembly 13), determine whether the RFID tag 34*e* on the container 34 is valid (such as by checking a database of valid RFID tags), and if the RFID tag is valid, activate a flow of liquid from the processing assembly 11 and/or the filling assembly 13 and into the container 34.

In an embodiment, the controllers 12 and/or 36 may be further configured to obtain physical characteristics of the container 34 (such as by checking a database of physical characteristics of containers having valid RFID tags), display instructions on a user device 15, initiate a reading of a weight of the container 34, determine whether a weight of the container 34 is in a valid weight range (such as by checking a database of valid weight ranges of valid containers), and determine whether the container 34 is full of liquid (such as by checking a database of weights of full containers).

In an embodiment, data relating to container identity, container physical characteristics, and container weight range may be stored in the database 12, in the cloud 14, or locally. In an embodiment, identity data may be data that relates a specific (i.e., valid) container 34 to a valid (i.e., authorized) user account. In an embodiment, physical characteristic data may relate to a type of the container, a size of the container, a volume capacity of the container, and/or an empty weight and/or a filled weight of a valid container associated with a valid user account. In an embodiment, weight range date may be data of a range of weights for a valid container—empty and filled.

In the foregoing embodiment, the controllers 12 and/or 36 may be further configured to identify a presence of the container 34 operatively adjacent to the filling assembly 13, determine whether an RFID tag 34*e* is valid, cause a load cell 39 to measure a weight of the container 34, compare the weight of the container with a valid weight range, and activate the processing assembly 11 and/or a valve 41 in the filling assembly 13.

In a further embodiment, the controllers 12 and/or 36 may be configured to determine whether an RFID tag 34*e* on a container 34 at the filling assembly 13 is valid, determine if there is a valid user account associated with the RFID tag, enable a valid user to purchase a fill of liquid, and activate the processing assembly 11 and/or initiate the filling assembly 13 to fill liquid into the container 34.

In the foregoing embodiment, the controllers 12 and/or 36 may be further configured to determine whether the system 10 is available to dispense liquid, identify a presence of the container 34 at the filling assembly 13, enable an invalid user to set up an account, process a purchase against an account of the valid user, disable the container 34 in an account of the valid user, and provide a receipt of the purchase to the valid user.

An embodiment of a filling process herein is further described in U.S. patent application Ser. No. 17/451,131, filed Oct. 15, 2021, which is incorporated herein in its entirety.

An embodiment of a monetization process is further described in U.S. patent application Ser. No. 17/451,131, filed Oct. 15, 2021, which is incorporated herein in its entirety.

It should be understood, of course, that the foregoing relates to exemplary embodiments of the disclosure and that modifications may be made without departing from the spirit and scope of the disclosure as set forth in the following claims.

We claim:

1. A liquid filling and dispensing system, comprising:

a filling assembly having:

a base subassembly having a solenoid and configured to receive a liquid from a processing assembly;

a container configured to receive, from a bottom area thereof, the liquid from the base subassembly; and a connection subassembly configured to releasably connect the container with the base subassembly by an applied force from the solenoid and that is perpendicular to a longitudinal axis of the container;

wherein the connection subassembly includes a ball bearing in the base subassembly and a race in the container.

2. The system of claim 1, further comprising:

a computer configured to control the filling assembly.

3. The system of claim 1, wherein the connection subassembly is further configured to transport liquid in only one direction from the base subassembly to the container.

4. The system of claim 1, wherein the connection subassembly is further configured to receive an externally applied force that is parallel to the longitudinal axis of the container.

5. The system of claim 1, further comprising:

a verification subassembly configured to identify the container as valid or not.

6. The system of claim 1, further comprising:

a weighing subassembly configured to weigh the container.

7. A liquid filling and dispensing system, comprising:

a filling assembly having:

a base subassembly configured to receive a liquid from a processing assembly;

a connection subassembly configured to releasably mate a bottom area of a container with a bottom area of the base subassembly by two forces that are orthogonal to one another;

wherein at least one of the two orthogonal forces are from a ball bearing in the connection subassembly and a race in the bottom area of the container that mates with the ball bearing; and a verification subassembly configured to identify the container as valid or not.

8. The system of claim 7, wherein the connection subassembly is further configured to transport liquid in only one direction therein.

9. The system of claim 7, wherein the connection subassembly is further configured to create a liquid pressure differential therein.

10. The system of claim 7, wherein the connection subassembly includes:

a first coupling configured to attach to one of the container and the base subassembly; and a second coupling configured to attach to the other of the container and the base subassembly.

11. The system of claim 7, wherein the filling assembly further comprises:

a weighing subassembly configured to weigh the container.

12. A liquid filling and dispensing system, comprising:

a filling assembly having:

a base subassembly configured to receive a liquid from the processing assembly;

a connection subassembly configured to releasably mate a bottom area of a container with a bottom area of the base subassembly by an applied force that is parallel to a longitudinal axis of the container and an applied force that is perpendicular to the longitudinal axis;

wherein the perpendicular applied force is from a solenoid having a recessed surface, wherein the solenoid is configured to impart a force on a ball bearing in a race in the bottom area of the container, wherein the ball bearing is configured to move into and out of the recessed surface; and a weighing subassembly configured to weigh the container.

13. The system of claim 12, wherein the base subassembly is further configured to enable the connection subassembly to move in a direction parallel to the longitudinal axis of the container.

14. The system of claim 12, wherein the connection subassembly includes:

a male coupling configured to attach to the bottom area of the container; and a female coupling configured to attach to the bottom area of the base subassembly.

15. The system of claim 12, wherein the weighing subassembly includes:

a load cell in communication with the ball bearing.

16. The system of claim 12, further comprising:

a verification subassembly configured to identify the container as valid or not.

* * * * *